United States Patent
Liu et al.

(10) Patent No.: US 11,924,779 B2
(45) Date of Patent: Mar. 5, 2024

(54) USER EQUIPMENT, RADIO NETWORK NODE AND METHODS PERFORMED THEREIN

(71) Applicant: Telefonaktiebolaget LM Ericsson (publ), Stockholm (SE)

(72) Inventors: Jinhua Liu, Beijing (CN); Mats Folke, Vällingby (SE); Min Wang, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 630 days.

(21) Appl. No.: 16/323,276

(22) PCT Filed: Dec. 28, 2018

(86) PCT No.: PCT/SE2018/051370
§ 371 (c)(1),
(2) Date: Feb. 5, 2019

(87) PCT Pub. No.: WO2019/139528
PCT Pub. Date: Jul. 18, 2019

(65) Prior Publication Data
US 2022/0232488 A1    Jul. 21, 2022

(30) Foreign Application Priority Data
Jan. 9, 2018 (WO) ................ PCT/CN2018/071921

(51) Int. Cl.
H04W 52/36 (2009.01)
(52) U.S. Cl.
CPC ............................. H04W 52/365 (2013.01)

(58) Field of Classification Search
CPC .................................................. H04W 52/365
See application file for complete search history.

(56) References Cited

U.S. PATENT DOCUMENTS

2020/0305148 A1* 9/2020 Niu ..................... H04W 52/365
2021/0185622 A1* 6/2021 Jiang .................. H04W 52/365

FOREIGN PATENT DOCUMENTS

| EP | 3 343 988 A1 | 7/2018 |
| WO | WO 2010/065759 A2 | 6/2010 |
| WO | WO 2017/049486 A1 | 3/2017 |

OTHER PUBLICATIONS

3GPP TS 38.213 V2.0.0, "3rd Generation Partnership Project; Technical Specification Group Radio Access Network; NR; Physical layer procedures for control (Release 15)," Technical Specification, Dec. 2017, 56 pages.

(Continued)

*Primary Examiner* — James P Duffy
(74) *Attorney, Agent, or Firm* — Christopher & Weisberg, P.A.

(57) ABSTRACT

Embodiments herein relates to a method performed by a UE for handling communication in a wireless communications network. The UE transmits a first indication in a PHR of a serving cell to a radio network node, wherein the first indication indicates presence of a first type of PH of a first carrier in the PHR of the serving cell, and wherein the first type is referring to an uplink RS transmission power. The PHR of the serving cell further comprises a second indication indicating presence of a PH of a second type of a second carrier of the serving cell, wherein the second type is referring to a user data transmission power.

15 Claims, 14 Drawing Sheets

(56) References Cited

OTHER PUBLICATIONS

3GPP TS 38.133 V1.0.0, "3rd Generation Partnership Project; Technical Specification Group Radio Access Network; NR; Requirements for support of radio resource management (Release 15)," Technical Specification, Dec. 2017, 38 pages.
3GPP TS 36.331 V14.2.0, "3rd Generation Partnership Project; Technical Specification Group Radio Access Network; Evolved Universal Terrestrial Radio Access (E-UTRA); Radio Resource Control (RRC); Protocol specification (Release 14)," Technical Specification, Mar. 2017, 721 pages.
3GPP TS 36.133 V15.0.0, "3rd Generation Partnership Project; Technical Specification Group Radio Access Network; Evolved Universal Terrestrial Radio Access (E-UTRA); Requirements for support of radio resource management (Release 15)," Technical Specification, Sep. 2017, 69 pages.
International Search Report and Written Opinion of the International Searching Authority, PCT/SE2018/051370, dated Mar. 15, 2019, 14 pages.
Ericsson, Power Headroom Reporting in NR, 3GPP TSG-RAN WG2 #100, Reno, US, Nov. 27-Dec. 1, 2017, 171182, Tdoc R2-1713484, XP051372192, 4 Pages.

* cited by examiner

| | Bit index 0 | 1 | 2 .... 7 |
|---|---|---|---|
| Octet 0 | P | V | PH (Type 1) |
| Octet 1 | R | R | $P_{c,max}$ |
| Octet 2 | P | V | PH (Type 3) |
| Octet 3 | R | R | $P_{c,max}$ |

Fig. 4c

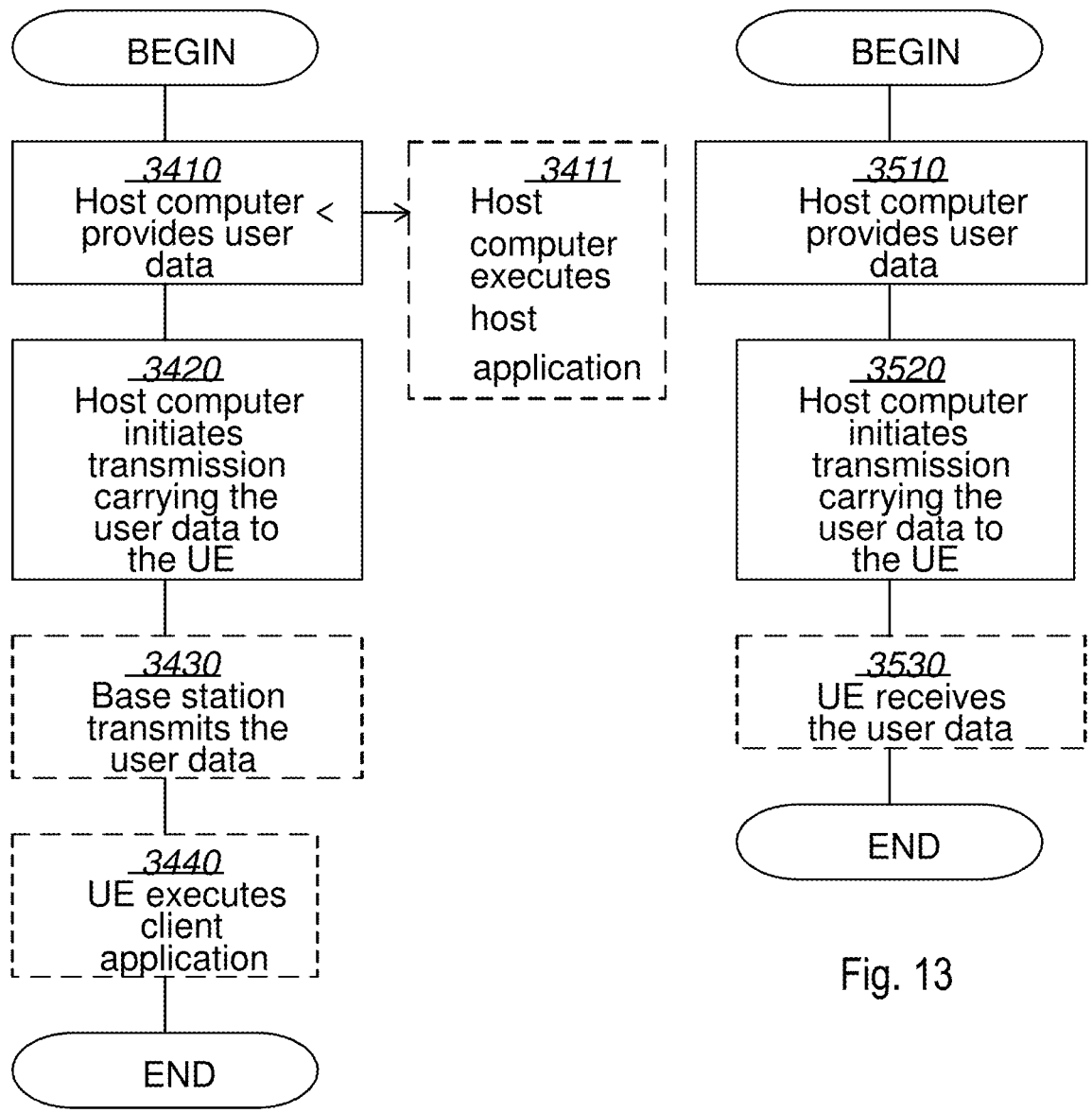

USER EQUIPMENT, RADIO NETWORK NODE AND METHODS PERFORMED THEREIN

TECHNICAL FIELD

Embodiments herein relate to a user equipment (UE), a radio network node and methods performed therein regarding wireless communication. In particular, embodiments herein relate to handling communication of a user equipment in a wireless communications network.

BACKGROUND

In a typical wireless communications network, user equipment (UE), also known as wireless communication devices, mobile stations, stations (STA) and/or wireless devices, communicate via a radio access network (RAN) to one or more core networks (CN). The RAN covers a geographical area which is divided into service areas also known as cells or cell areas, with each service area being served by a radio network node e.g., a Wi-Fi access point or a radio base station (RBS), which in some networks may also be called, for example, a gNodeB, a NodeB or an eNodeB. The service area is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

The evolving Fifth Generation (5G) standard New Radio (NR) is aiming to operate in a wide range of frequencies from below 1 GHz up to 100 GHz. As the low carrier frequency bands were already deployed with 2G, 3G and 4G wireless communication systems, NR will be deployed at relatively higher frequencies. For wireless communication, the propagation loss will be roughly proportional to the square of the carrier frequency. Hence there can be coverage issue for wireless communication over high carrier frequencies. For downlink, the radio network node may be equipped with powerful antenna systems and powerful amplifiers to boost the transmission power density, hence the DL coverage can be boosted. However, for UL, there are several restrictions such as transmit power, antenna size and cost. Hence there can be mismatch between UL and DL for a cell in NR, called NR cell, at high frequency.

For solving this, NR introduced a supplementary uplink (SUL) carrier for a NR cell, i.e. a NR cell has a SUL carrier plus a NR UL carrier. The SUL carrier is supposed to be a low frequency carrier which can be shared, in time and/or frequency domain, with another radio access technology (RAT) system such as Long Term Evolution (LTE). FIG. 1 shows the coverages of the NR UL carrier and the SUL carrier in a NR cell. It was further agreed that only single physical uplink shared channel (PUSCH) for data transmission is supported. The PUSCH is transmitted either on NR UL carrier or NR SUL carrier.

From 3GPP TS 36.331-e20, a power headroom report (PHR) configuration for a UE is configured in a Medium Access Control (MAC)-MainConfig information element (IE). The PHR indicates an amount of power (P) that is left for a UE to use in addition to the power being used by current transmission. There are both configurations with respect to the PHR triggering and the MAC control element (CE) format for PHR content. One set of parameters are applied for aggregated carriers belonging to one MAC entity. For PHR triggering, there are 3 parameters:

periodicPHR-Timer; which is a parameter that indicates an interval for the periodical PH reports.

prohibitPHR-Timer; which is a parameter that indicates that reporting a PH report is prohibited when this timer is running, this is used to avoid too frequent PHRs.

dl-PathlossChange: which is a parameter that indicates a threshold and when a pathloss change of a carrier exceed this threshold, a new PHR is estimated. Whether the estimated PH is reported further depends on the status of the timers. These parameters may be configured via Radio Resource Control (RRC) signaling, e.g. in a MAC-MainConfig message shown as below.

```
MAC-MainConfig ::=           SEQUENCE {
    phr-Config        CHOICE {
        release                  NULL,
        setup                    SEQUENCE {
            periodicPHR-Timer    ENUMERATED {sf10, sf20, sf50, sf100, sf200,
                                                sf500, sf1000, infinity},
            prohibitPHR-Timer    ENUMERATED {sf0, sf10, sf20, sf50, sf100,
                                                sf200, sf500,
sf1000},
            dl-PathlossChange    ENUMERATED {dB1, dB3, dB6, infinity}
        }
    }                                        OPTIONAL, -- Need
ON
```

MAC CEs for PHR in NR have been agreed in 3GPP.

A Single PHR MAC CE is identified by a MAC Protocol Data Unit (PDU) subheader with Logical Channel Identity (LCID) as specified in a table in the specification. It has a fixed size and consists of two octets defined as follows (see FIG. 2a):

R: reserved bit, set to "0";

Power Headroom (PH): this field indicates the power headroom level. The length of the field is 6 bits. The reported PH and the corresponding power headroom levels are shown in Table 6.1.3.8-1 below, the corresponding measured values in dB are specified in TS 38.133 v. 14.0.0;

$P_{CMAX,c}$: this field indicates the power $P_{CMAX,c}$ (as specified in TS 38.213 v.14.0.0) used for calculation of the preceding PH field. The reported $P_{CMAX,c}$ and the corresponding nominal UE transmit power levels are shown in Table 6.1.3.8-2 (the corresponding measured values in dB are specified in TS 38.133 v. 14.0.0).

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

Multiple PHR MAC CE: Furthermore, a Multiple PHR MAC CE may be identified by a MAC PDU subheader with LCID. It includes the bitmap, a Type 2 PH field and an octet containing the associated $P_{CMAX,c}$ field (if reported) for a primary cell (PCell), a Type 2 PH field and an octet containing the associated $P_{CMAX,c}$ field (if reported) for either Primary Secondary Cell (PSCell) or Physical Uplink Control Channel (PUCCH) Secondary cell (SCell), a Type 1 PH field and an octet containing the associated $P_{CMAX,c}$ field (if reported) for the PCell. It further includes, in ascending order based on the ServCellIndex, one or multiple of Type 1 PH fields and octets containing the associated $P_{CMAX,c}$ fields (if reported) for SCells indicated in the bitmap.

The presence of the Type 2 PH field for the PCell is configured by a phr-Type2PCell, and the presence of the Type 2 PH field for either the PSCell or the PUCCH SCell is configured by a phr-Type2OtherCell.

A single octet bitmap is used for indicating the presence of PH per SCell when the highest SCellIndex of the SCell with configured uplink is less than 8 (FIG. 2b), otherwise four octets are used (FIG. 2c). Thus, FIG. 2b shows Multiple PHR MAC CEs where the highest SCellIndex of the SCell with configured uplink is less than 8. FIG. 2c shows Multiple PHR MAC CEs where the highest SCellIndex of the SCell with configured uplink is equal to or higher than 8.

The PHR MAC CEs are defined as follows:

$C_i$: this field indicates the presence of a PH field for the SCell with SCellIndex i as specified in 3GPP TS 38.331. The Ci field set to "1" indicates that a PH field for the SCell with SCellIndex i is reported. The Ci field set to "0" indicates that a PH field for the SCell with SCellIndex i is not reported;

R: reserved bit, set to "0";

V: this field indicates if the PH value is based on a real transmission or a reference format. For Type 1 PH, V=0 indicates real transmission on Physical uplink shared channel (PUSCH) and V=1 indicates that a PUSCH reference format is used. For Type 2 PH, V=0 indicates real transmission on PUCCH and V=1 indicates that a PUCCH reference format is used. For Type 3 PH, V=0 indicates real transmission on sounding reference signal (SRS) and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted;

Power Headroom (PH): this field indicates the power headroom level. The length of the field is 6 bits. The reported PH and the corresponding power headroom levels are shown in Table 6.1.3.8-1 (the corresponding measured values in dB for the NR serving cell are specified in TS 38.133 while the corresponding measured values in dB for the LTE serving cell are specified in TS 36.133);

P: this field indicates whether the MAC entity applies power backoff due to power management. The MAC entity shall set P=1 if the corresponding $P_{CMAX,c}$ field would have had a different value if no power backoff due to power management had been applied;

$P_{CMAX,c}$: if present, this field indicates the $P_{CMAX,c}$ or $\tilde{P}_{CMAX,c}$ (as specified in TS 38.213 [6]) used for calculation of the preceding PH field. The reported $P_{CMAX,c}$ and the corresponding nominal UE transmit power levels are shown in Table 6.1.3.8-2 (the corresponding measured values in dB for the NR serving cell are specified in TS 38.133 [11] while the corresponding measured values in dB for the LTE serving cell are specified in TS 36.133).

Type 3 PHR is supported in NR and RAN1 has made agreements concerning SRS transmission at RAN1 #91. For example, LTE supports SRS PHR reporting for serving cell in uplink where PUSCH is not configured, and SRS virtual PHR reporting is based on one SRS resource configured by the radio network node. Reference signal PHR reporting such as SRS PHR reporting is denoted in LTE as type-3.

SUMMARY

The UE may transmit uplink control signals on one carrier while the UL data transmission is performed on another UL carrier. For one instance, the UE may transmit PUCCH on the SUL carrier, while keeping the data transmission or user data transmission on the NR carrier. For another instance, the UE may transmit SRS signals on both UL carriers while PUSCH is transmitted on one of the carriers.

Up to now, none of the defined PHR formats is feasible to carry type 3 PHR of a UL carrier for SUL cases. For SUL cases, it means that a single serving cell reports both Type 1 PH, and Type 3 PH (optionally also Type 2 PH in future releases) respectively for different UL carriers in a single PHR MAC CE at the same time. Basically, the power headroom is calculated using the formula: PH=allowed maximum allowed transmission power (in dBm) minus the actual transmission power in a reference transmission (in dBm). Type 1 PH is estimated by referring to the transmission power of a PUSCH; Type 2 PH is estimated by referring to the summary of the PUSCH transmission power and the concurrent PUCCH transmission power; Type 3 PH is calculated by referring to the uplink reference signal (RS), such as sounding reference signal (SRS), transmission power. The detail schemes to estimate PHs of Type 1 and 2 are described in Section 7.7 of 3GPP TS 38.213 v2.0, and the scheme to estimate PH of Type 3 is not added.

A first format, i.e., the single PHR MAC CE as in LTE, is designed to carry only Type 1 PH. While a second format, i.e., the multiple PHR MAC CEs, as PHR MAC CEs are used for carrier aggregation (CA) or dual connectivity (DC) in LTE, is not feasible either, due to reasons such as: a second format is basically designed to report PHR for a UE in CA or DC, and using this format for a single serving cell PHR report, gives a risk of additional overhead, especially due to the bitmap field. Furthermore, in the second format, the primary cell is not able to report Type 1 PH, Type 2 PH, and Type 3 PH at the same time.

Embodiments herein update existing PHR formats for NR in order to support a Type 3 PHR for a serving cell e.g. configured with a SUL carrier.

An object of embodiments herein is to provide a mechanism that improves the existing PHR formats to better support plural types of PHR, e.g. Type 3 PHR, for a case where the SUL carrier is configured thus leading to an improved performance of the wireless communications network when handling communication of a UE in the wireless communications network.

According to an aspect the object is achieved by providing a method performed by a UE for handling communication in a wireless communications network. The UE transmits a first indication in a PHR of a serving cell to a radio network node. The first indication indicates presence of a first type of PH of a first carrier in the PHR of the serving cell, and wherein the first type is referring to an uplink RS transmission power. The PHR of the serving cell further comprises a second indication indicating presence of a PH of a second type of a second carrier of the serving cell, wherein the second type is referring to a user data transmission power.

According to another aspect the object is achieved by providing a method performed by a radio network node for handling communication in a wireless communications network. The radio network node receives, from a UE, a first indication in a PHR of a serving cell, wherein the first indication indicates presence of a first type of PH of a first carrier in the PHR of the serving cell. The first type is referring to an uplink RS transmission power, and wherein the PHR of the serving cell further comprises a second indication indicating presence of a PH of a second type of a second carrier of the serving cell, wherein the second type is referring to a user data transmission power. The radio network node further estimates a transmission power status of the UE based on the first and/or second type of the PH in the PHR of the serving cell. Transmission power status means e.g. how much power is available and/or used for each type or similar. The estimated transmission power status may then be used to rank adaptation or power control of respective carrier.

It is furthermore provided herein a computer program product comprising instructions, which, when executed on at least one processor, cause the at least one processor to carry out any of the methods above, as performed by the radio network node or the UE, respectively. It is additionally provided herein a computer-readable storage medium, having stored thereon a computer program product comprising instructions which, when executed on at least one processor, cause the at least one processor to carry out the method according to any of the methods above, as performed by the radio network node or the UE, respectively.

According to yet another aspect the object is achieved by providing a UE for handling communication in a wireless communications network. The UE is configured to transmit a PHR of a serving cell to a radio network node wherein the PHR of the serving cell comprises a first indication indicating presence of a first type of PH of a first carrier in the PHR of the serving cell, and wherein the first type is referring to an uplink RS transmission power. The PHR of the serving cell further comprises a second indication indicating presence of a PH of a second type of a second carrier of the serving cell, wherein the second type is referring to a user data transmission power.

According to still another aspect the object is achieved by providing a radio network node for handling communication in a wireless communications network. The radio network node is configured to receive from a UE a first indication in a PHR of a serving cell, wherein the first indication indicates presence of a first type of PH of a first carrier in the PHR of the serving cell and wherein the first type is referring to an uplink RS transmission power. The PHR of the serving cell further comprises a second indication indicating presence of a PH of a second type of a second carrier of the serving cell, wherein the second type is referring to a user data transmission power. The radio network node is further configured to estimate a transmission power status of the UE based on the first and/or second type of the PH in the PHR of the serving cell. The PH of each type may also be taken into account.

Embodiments herein describe methods wherein the PHR indicate PH of different types (e.g. type 1 and type 3) wherein at least one type refers to the uplink RS transmission power, e.g. SRS transmission power i.e. type 3, enabling the PHR of carriers at high frequencies and carriers at lower frequencies to be differentially triggered so that the PHs for all carriers may be reported in time with an optimized overhead. This leads to an improved performance of the wireless communications network when handling communication of a UE in the wireless communications network since the radio resources carrying the PHR is efficiently used.

BRIEF DESCRIPTION OF THE DRAWINGS

Embodiments will now be described in more detail in relation to the enclosed drawings, in which:

FIG. 2a shows a Single PHR MAC CE;

Figures 2A, 2B, 2C:
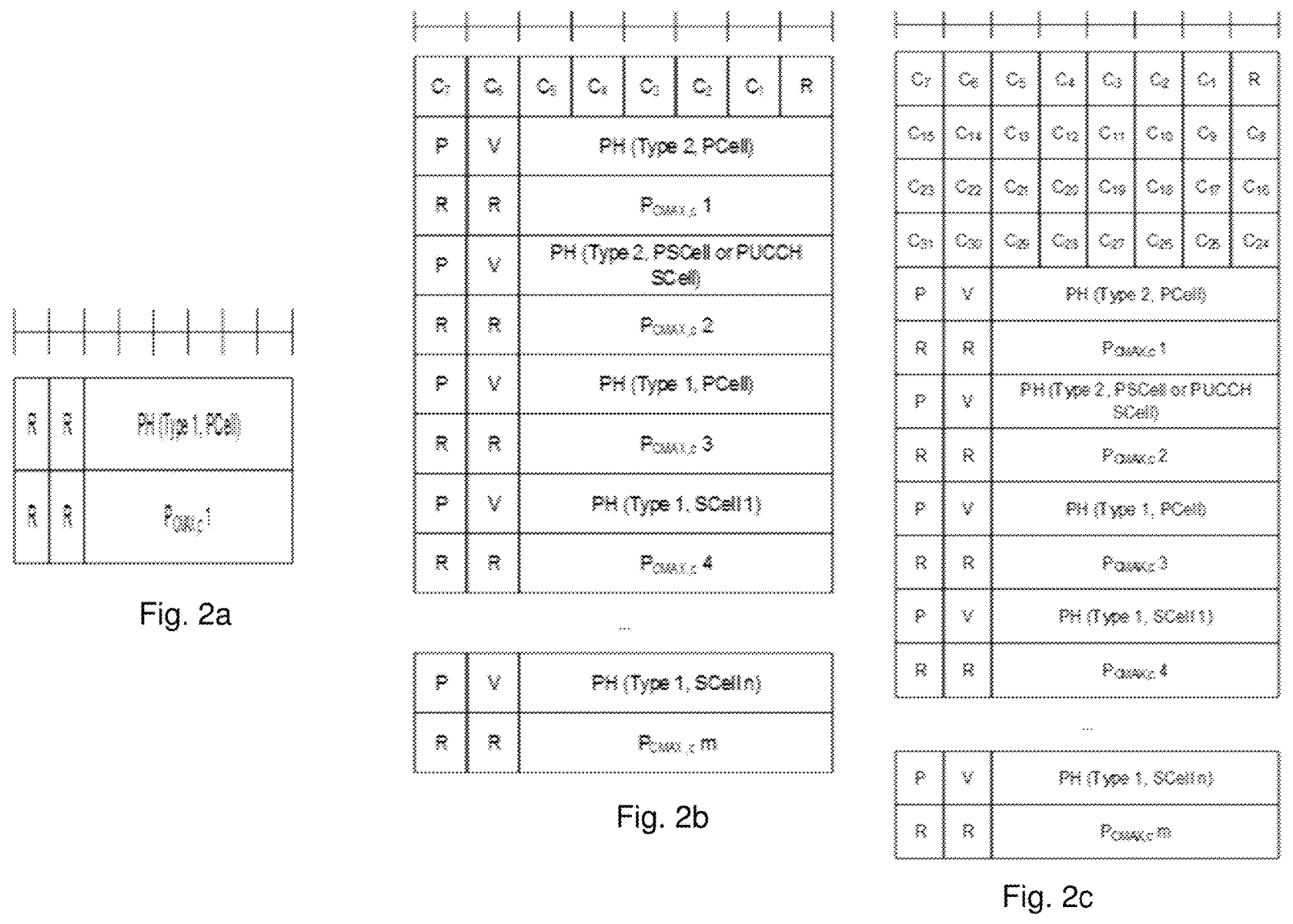

FIG. 2b shows Multiple PHR MAC CEs with the highest SCellIndex of SCell with configured uplink is less than 8;

FIG. 2c shows Multiple PHR MAC CEs with the highest SCellIndex of SCell with configured uplink is equal to or higher than 8;

FIG. 4c shows a subheader in a MAC-CE according to embodiments herein;

FIG. 12 shows methods implemented in a communication system including a host computer, a base station and a user equipment in accordance with some embodiments;

FIG. 13 shows methods implemented in a communication system including a host computer, a base station and a user equipment in accordance with some embodiments;

DETAILED DESCRIPTION

Figure 1:
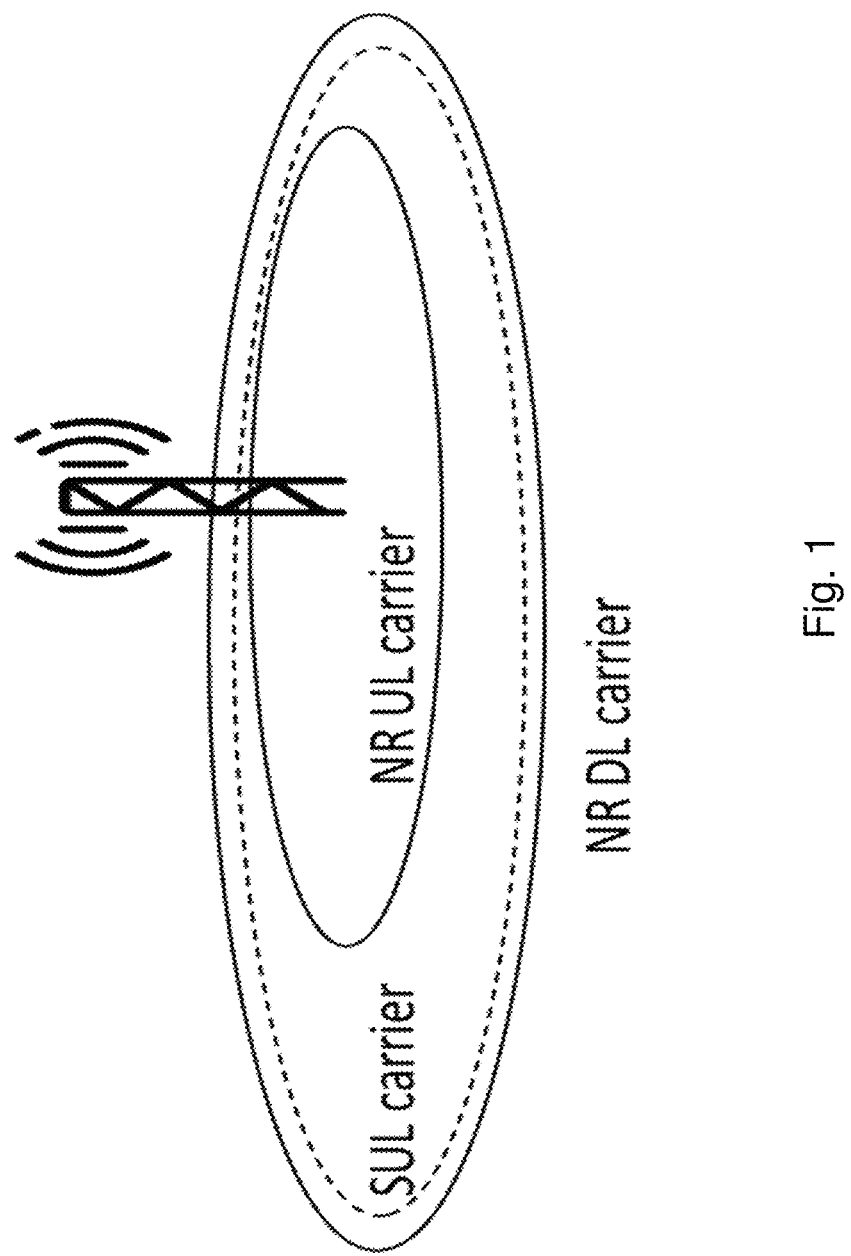
FIG. 1 shows a schematic overview of a coverage of a 3GPP 5G New Radio (NR) network.
Figure 3:
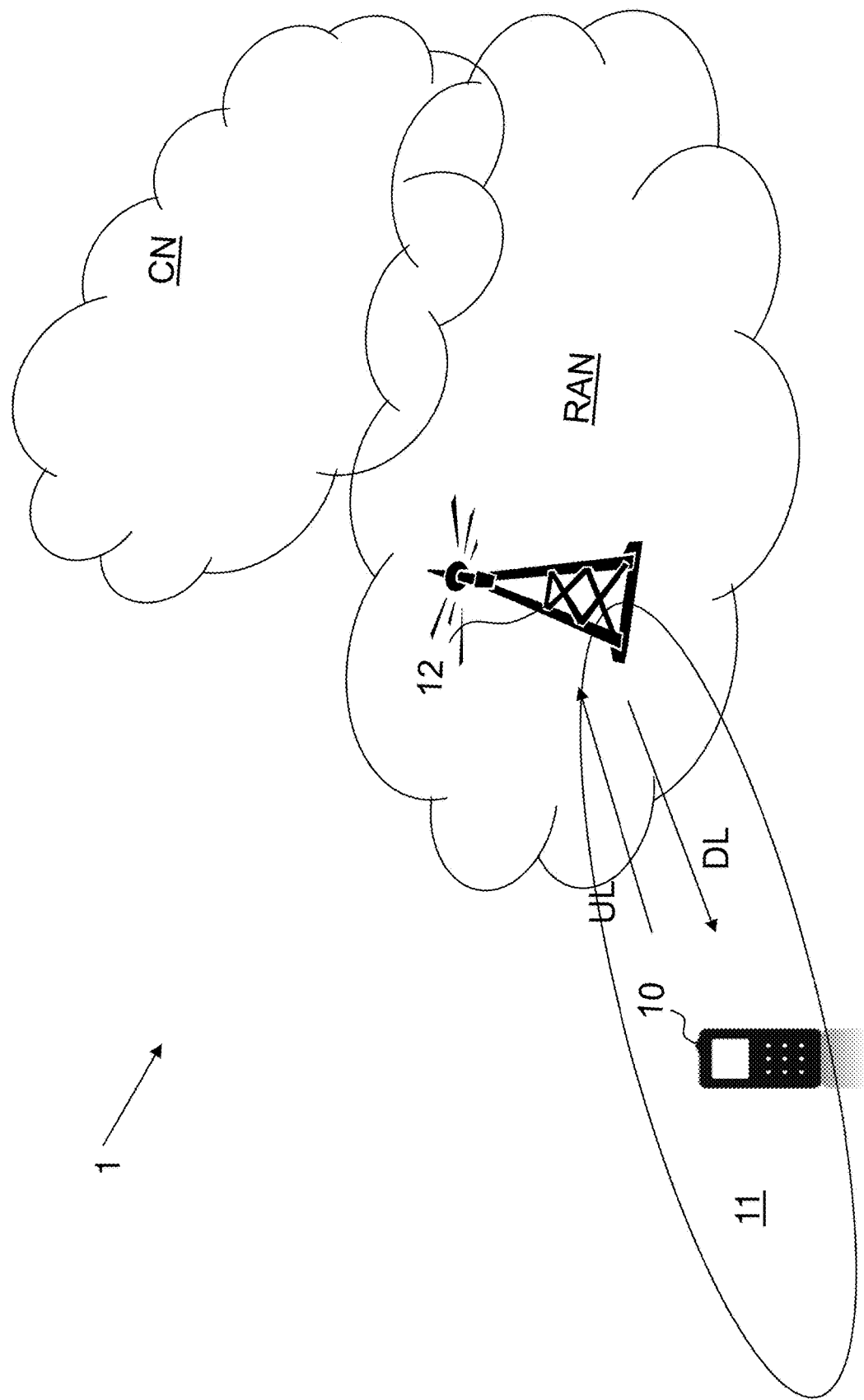
FIG. 3 is a schematic overview depicting a wireless communications network according to embodiments herein.

Embodiments herein relate to wireless communications networks in general. FIG. 3 is a schematic overview depicting a wireless communications network 1. The wireless communications network 1 comprises one or more RANs and one or more CNs. The wireless communications network 1 may use one or a number of different technologies. Embodiments herein relate to recent technology trends that are of particular interest in a 5G context, however, embodiments are also applicable in further development of existing wireless communication systems such as e.g. Wideband Code Division Multiple Access (WCDMA) and LTE.

In the wireless communications network 1, UEs e.g. a UE 10 such as a mobile station, a non-access point (non-AP) STA, a STA, a wireless device and/or a wireless terminal, communicate via one or more Access Networks (AN), e.g. RAN, to one or more core networks (CN). It should be understood by the skilled in the art that "UE" is a non-limiting term which means any terminal, wireless communication terminal, user equipment, Internet of things (IoT) operable device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communications network 1 comprises a radio network node 12 providing radio coverage over a geographical area, a first service area 11, of a first radio access technology (RAT), such as NR, LTE, or similar. The radio network node 12 may be a transmission and reception point e.g. a radio network node such as a Wireless Local Area Network (WLAN) access point or an Access Point Station (AP STA), an access node, an access controller, a base station, e.g. a radio base station such as a gNodeB (gNB), an evolved Node B (eNB, eNode B), a base transceiver station, a radio remote unit, an Access Point Base Station, a base station router, a transmission arrangement of a radio base station, a stand-alone access point or any other network unit or node capable of communicating with a UE within the area served by the radio network node 12 depending e.g. on the first radio access technology and terminology used. The radio network node 12 may be referred to as a serving radio network node wherein the first service area may be referred to as a serving cell, and the serving network node communicates with the UE 10 in form of DL transmissions to the UE 10 and UL transmissions from the UE 10. It should be noted that a service area may be denoted as cell, beam, beam group or similar to define an area of radio coverage.

The UE 10 may be configured for using a first carrier in the UL and a second carrier in the UL. The first carrier may have a different coverage level than the second carrier. The first carrier may be a NR carrier and the second carrier may be a SUL carrier or vice versa. For example, the first carrier may be using a frequency being lower than the second carrier. The UE 10 may transmit PHR of each carrier.

According to embodiments herein the UE transmits a PHR for the serving cell to the radio network node 12. The PHR comprises a first indication indicating presence of a first type of PH of a first carrier in the PHR of the serving cell, and wherein the first type is referring to an uplink RS transmission power. The PHR of the serving cell further comprises a second indication indicating presence of a PH of a second type of a second carrier of the serving cell, wherein the second type is referring to a user data transmission power. Thus, the UE 10 transmits to the radio network node 12 the PHR comprising the first indication which first indication indicates whether the PHR comprises a PHR of a type, e.g. type 3 PH, and wherein the type is referring to the uplink RS transmission power. The indication may be one bit, indicating true or false or similar. The radio network node 12 estimates a transmission power status of the UE 10 based on the received type of the PH in the PHR and may also take into account PH reported in the PHR. For example, in the following, various embodiments are described to clarify the embodiments herein for e.g. NR in a scenario where an SUL carrier is configured for the UE 10. The first and/or second indication indicating the presence of the type, such as Type 3 PH, may be comprised in a subheader of a MAC control element (CE). The methods according to embodiments herein are performed by the UE 10 and the radio network node 12, and as an alternative, a Distributed Node DN and functionality, e.g. comprised in a cloud may be used for performing or partly performing the methods.

According to some embodiments herein, a single control element such as a PHR MAC CE, which may be similar as the single connectivity PHR MAC CE in LTE but with a field of $P_{cmax}$, is updated to report Type 1 PH and also Type 3 PH in a single PHR MAC CE. This new format is applied when there is a reference signal (RS) transmission, such as an SRS transmission, configured on one carrier such as the first carrier while user plane data transmission, such as PUSCH transmission, is on another carrier such as the second carrier. There are two possible cases. In the first case, data transmission is on an NR carrier such as the second carrier, while there is RS transmission on a SUL carrier such as the first carrier, or vice versa, i.e. the data transmission is on the SUL carrier such as the second carrier, while there is RS transmission on the NR carrier such as the first carrier. This new format is either a separate format, or the existing PHR format is updated without adding separate PHR format for Type 3 report.

Figure 4A:
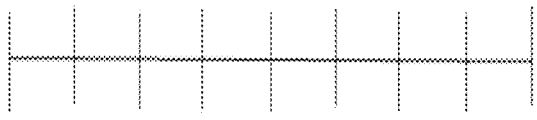
FIG. 4a shows a subheader in a MAC-CE according to embodiments herein.

Example 1: The first indication may comprise a bitmap field that is added to the beginning of the MAC CE, to indicate whether e.g. the Type 3 PH is present in the MAC CE. The indicator takes the value "1" means that there is a Type 3 PH present. A corresponding $P_{cmax,Ty3}$ field for Type 3 may also be added accordingly. Otherwise, the indicator takes the value "0" means that there is no Type 3 PH present. A length field L may be added in the MAC subheader to indicate an actual length of the MAC CE. According to this example, the PH of the UL carrier with data transmission i.e. the second carrier e.g. PUSCH is placed ahead of the UL carrier with only RS transmission i.e. the first carrier. See FIG. 4a.

Figure 4B:
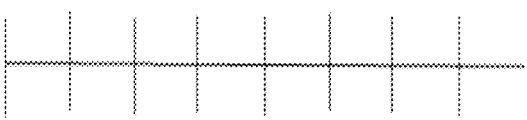
FIG. 4b shows a subheader in a MAC-CE according to embodiments herein.

Example 2, one of the R bit in the $P_{cmax,Ty1}$ field can be used as an indicator for the presence subsequent Type 3 PH, e.g. R1. In this case, the bitmap Octet may be saved. In this option, a length field L may be added in the MAC subheader to indicate the actual length of the MAC CE. See FIG. 4b.

Example 3, the radio network node 12 may configure a MAC CE with fixed size to report Type 3 PH, the PHs are placed in fixed order so that radio network node 12 may determine the correspondence between the received PHs and the reference UL transmissions with respect to which the PHs are derived. In this option, there is no bitmap field, a length field L, or R bit re-definition in the MAC sub header. See FIG. 4c.

Figure 5:
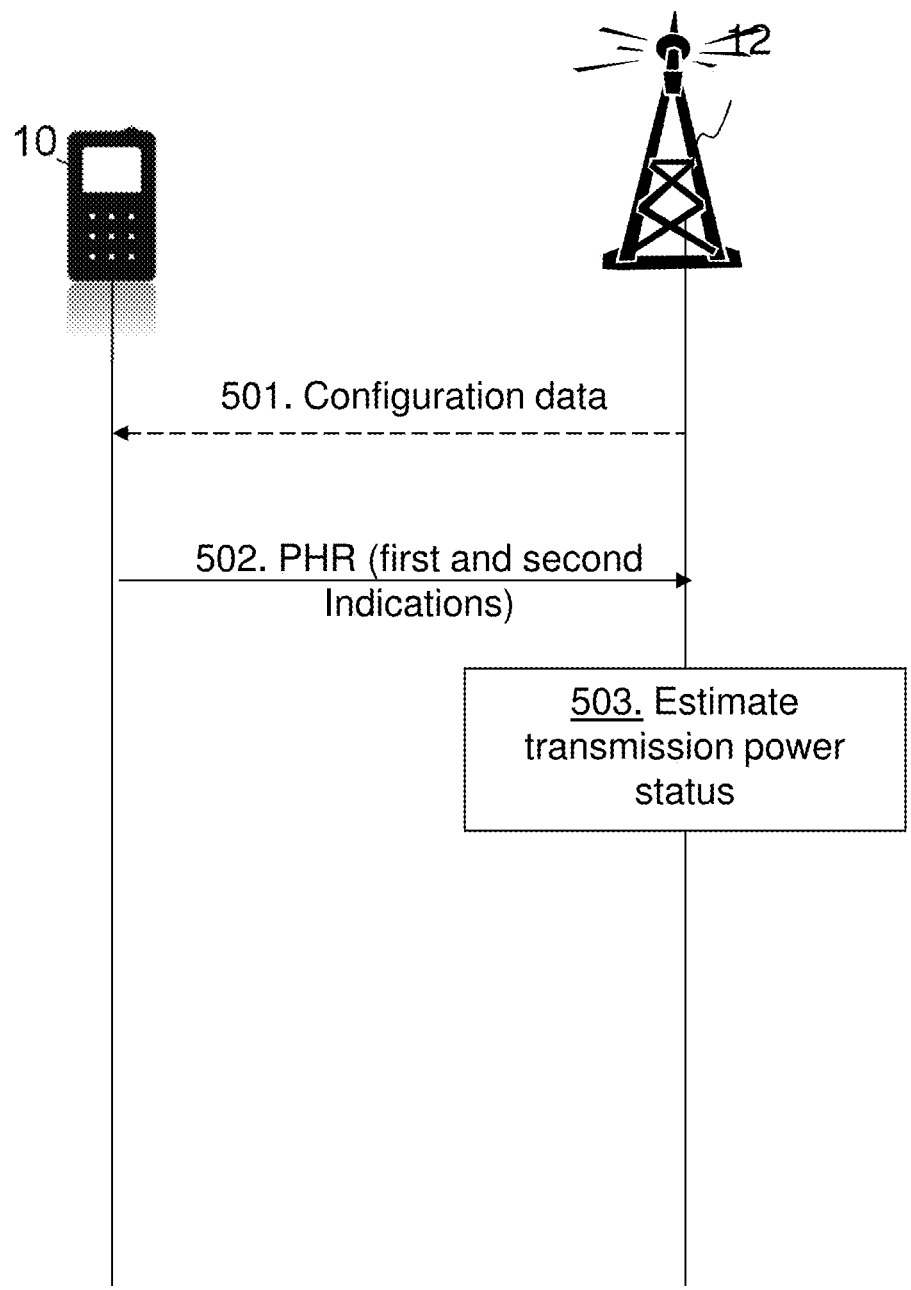
FIG. 5 shows a combined flowchart and signaling scheme according to embodiments herein.

FIG. 5 is a combined flowchart and signaling scheme according to embodiments herein.

Action 501. The radio network node 12 may configure the UE 10 by transmitting configuration data indicating whether the UE 10 is enabled to report an indication of type referring to UL RS transmission power in the PHR.

Action 502. The UE 10 transmits, to the radio network node 12, the PHR of the serving cell 11 comprising the first indication, wherein the first indication indicates presence of a first type of PH of a first carrier in the PHR of the serving cell. The first type is referring to UL RS transmission power, e.g. SRS transmission power, and wherein the PHR of the serving cell further comprises the second indication indicating presence of a PH of a second type of a second carrier of the serving cell, wherein the second type is referring to a user data transmission power. Each indication indicating a type, such as type 3, of PH of a carrier. The type is referring to reference signal transmission power.

Action 503. The radio network node 12 then estimates a transmission power status of the UE based on the first and/or second type of the PH in the PHR of the serving cell e.g. type of the PH in the PHR. The PH of each type in the PHR may also be used to estimate the transmission power state of the UE 10.

Figure 6:
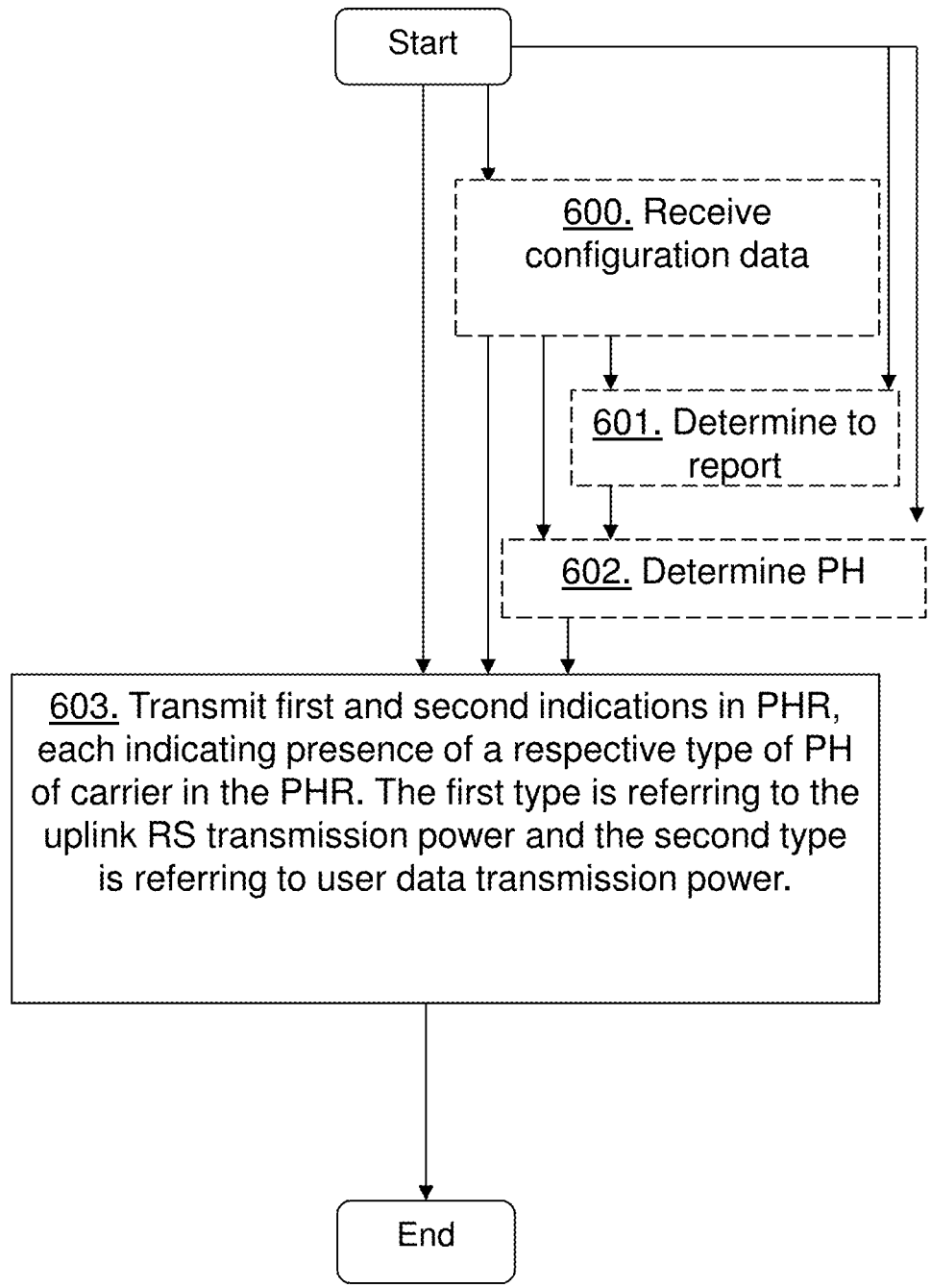
FIG. 6 shows a schematic flowchart depicting a method performed by a UE according to embodiments herein.

The method actions performed by the UE 10 for handling communication in the communications network 1 according to embodiments herein will now be described with reference to a flowchart depicted in FIG. 6. The actions do not have to be taken in the order stated below, but may be taken in any suitable order. Actions performed in some embodiments are marked with dashed boxes.

Action 600. The UE 10 may receive configuration data indicating whether the UE is enabled to report the type of PH or not.

Action 601. The UE 10 may, according to some embodiments herein, determine whether to report Type 3 PH for a cell, e.g. configured with a SUL carrier, according to several options. In a first option, the UE 10 may determine to report Type 3 PH based on whether the UE 10 has been configured to initiate SRS transmission on a carrier, while keeping PUSCH transmission on another carrier. In this case, there is no explicit signaling to enable Type 3 PH report for the UE 10. In a second option, there is explicit signaling exchanged between the UE 10 and the radio network node 12, to configure and/or enable the UE 10 to report Type 3 PH. The signaling means may include radio resource control (RRC) signaling, MAC CE, or other Layer one and/or Layer two (L1/L2) signaling, such as carried by physical downlink control channel (PDCCH).

Action 602. The UE 10 may determine PH of one or more carriers by comparing transmission power with a maximum transmit power of the one or more carriers.

Action 603. The UE 10 transmits the first indication in the PHR of the serving cell to the radio network node 12, wherein the first indication indicates presence of the first type of PH of the first carrier in the PHR of the serving cell, and wherein the first type is referring to an uplink RS transmission power, such as SRS transmission power. The PHR of the serving cell further comprises the second indication indicating presence of the PH of the second type of the second carrier of the serving cell. The second type is referring to a user data transmission power. The UE may thus transmit the first indication in the PHR, to the radio network node 12, wherein the first indication indicates presence of a type, e.g. type 3, of PH of the carrier in the PHR. The type may be referring to the SRS transmission power. The PH may also be comprised in the PHR. The PHR further comprises the second indication indicating presence of a PH of another type of another carrier, wherein the other type is referring to a user data transmission power. The first and/or the second indication may be comprised in a subheader of a medium access control control element (MAC-CE). The first carrier may be a new radio uplink carrier and the second carrier may be a supplementary uplink, SUL, carrier, or vice versa. The first type is a type 3 referring to a sounding reference signal, SRS, transmission power and the second type is a type 1 referring to the user data transmission power. The first indication and the second indication may be set in a preconfigured order in the PHR. Thus, according to embodiments herein, the UE 10 is preconfigured or configured by the radio network node 12 that the PH of the second carrier, e.g. SUL carrier, and/or the PH of the first carrier, e.g. NR carrier, are placed in a fixed order regardless the PUSCH, i.e. data transmission, is on which carrier. The order of PH placement may be determined according to the type of the carriers, such as the PH is triggered due to the transmission on the NR carrier is placed first, the PH is triggered due to the transmission on the SUL carrier is placed second and so on.

According to embodiments herein, when there is simultaneous PUCCH-PUSCH transmission configured in the cell, which is configured with an SUL carrier, the Type 2 PH may also be reported together with other types of PH. The similar solution as that in previous embodiments is also applicable to the type 2 PH. The eventual presence order between different types of PH fields in the MAC CE may be different from the examples that are shown. For example, Type 2 PH may be present first, then Type 1 and Type 3 PHs are present sub sequentially. It may also be possible that the Type 3 PH is present prior to the Type 1 PH. Then, Type 1 PH is present last.

According to embodiments herein, in case a NR cell with SUL is aggregated with multiple other NR cells (such as in a CA or DC scenario), for the cell with SUL carrier which is the PCell or PSCell, or PUCCH Scell. The PH of Type 3 is also supported for the UL carrier configured with only SRS in the cell. In this case, a separate new PHR format based on Multiple PHR MAC CE (which is the format similar as the extended PHR MAC CE, or DC PHR MAC CE in LTE) may be added, or an update to the existing PHR format may be implemented.

Embodiments herein may be implemented in any new MAC CE format for PHR. Accordingly, in the subheader of the MAC CE, a new logical channel ID may be also used so that the radio network node 12 can determine the new MAC CE format based on the associated new logical channel ID in the subheader.

According to embodiments herein there may be no new update to the existing PHR format, in order to report Type 3 PH, the UE MAC entity need to report multiple times consecutively for different types of PH triggering. In one example, the UE MAC entity builds up a PHR MAC CE for Type 1 PH, consecutively, the UE MAC entity builds up a separate PHR MAC CE for other types of PH, for example, Type 3 PH. In such way, there may be up to two PHR MAC CEs multiplexed in one PUSCH instead of up to one PHR MAC CE in one PUSCH as used currently. These consecutive PHR MAC CEs may be transmitted in the same or different MAC PDUs. The radio network node 12 interprets the PHRs according to the predefined transmission order for them. As another option, additional indicators may be added in the MAC sub-headers to indicate the presence/absence of the PHR MAC CEs associated with a specific PH type. In yet another option, the PHR MAC CEs may be placed using the padding bits.

Figure 7:
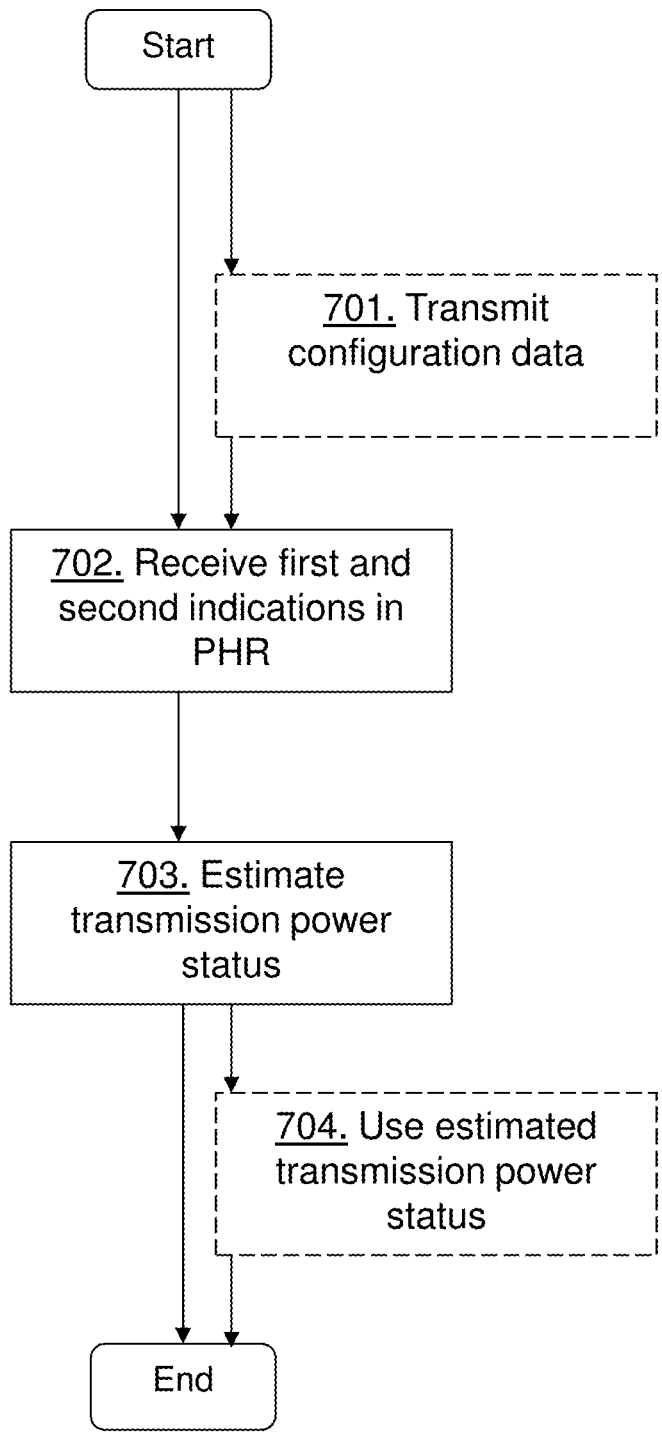
FIG. 7 shows a schematic flowchart depicting a method performed by a radio network node according to embodiments herein.

The method actions performed by the radio network node 12 for handling communication (of the UE 10) in the wireless communications network 1 according to embodiments will now be described with reference to a flowchart depicted in FIG. 7. The actions do not have to be taken in the order stated below, but may be taken in any suitable order. Actions performed in some embodiments are marked with dashed boxes.

Action 701. The radio network node 12 may transmit configuration data to the UE 10, wherein the configuration data indicates whether the UE 10 is enabled to transmit the indication in the PHR or not, i.e. enabled to report the type of PH or not.

Action 702. The radio network node 12 receives, from the UE 10, the first indication in the PHR of the serving cell, wherein the first indication indicates presence of the first type of PH of the first carrier in the PHR of the serving cell, and wherein the first type is referring to an uplink RS transmission power. The PHR of the serving cell further comprises the second indication indicating presence of the PH of the second type of the second carrier of the serving cell. The second type is referring to a user data transmission power. Thus, the first indication in the PHR, which first indication indicates (indirectly or directly) presence of the type of PH of a carrier in the PHR and wherein the type is referring to an uplink RS transmission power such as SRS transmission power. The first indication and the second indication may be in a preconfigured order in the PHR of the serving cell, thus, the radio network node 12 may know which PH value relates to which type of PH. The first indication and/or the second indication may be comprised in a subheader of MAC control element e.g. see FIGS. 4a and 4b. The first carrier may be a new radio uplink carrier and the second carrier may be a SUL carrier, or vice versa. The first type may be a type 3, referring to a SRS transmission power, and the second type may be a type 1, referring to the user data transmission power.

Action 703. The radio network node 12 then estimates the transmission power status (state) of the UE 10 based on the first and/or second type of the PH in the PHR of the serving cell e.g. on the type of the PH in the PHR. Also the actual PH (value) may be taken into account when estimating transmission power of the different carriers.

Action 704. The radio network node 12 may use the estimated transmission power status in modulation coding scheme, MCS, selection, rank adaption and/or power control at the radio network node 12 of respective carrier. E.g. based on the transmission power status of the UE 10, the radio network node 12 may e.g. perform proper link adaption based on the transmission power status for the UE 10, including modulation coding scheme (MCS) selection, rank adaption and power control etc.

Figure 8:
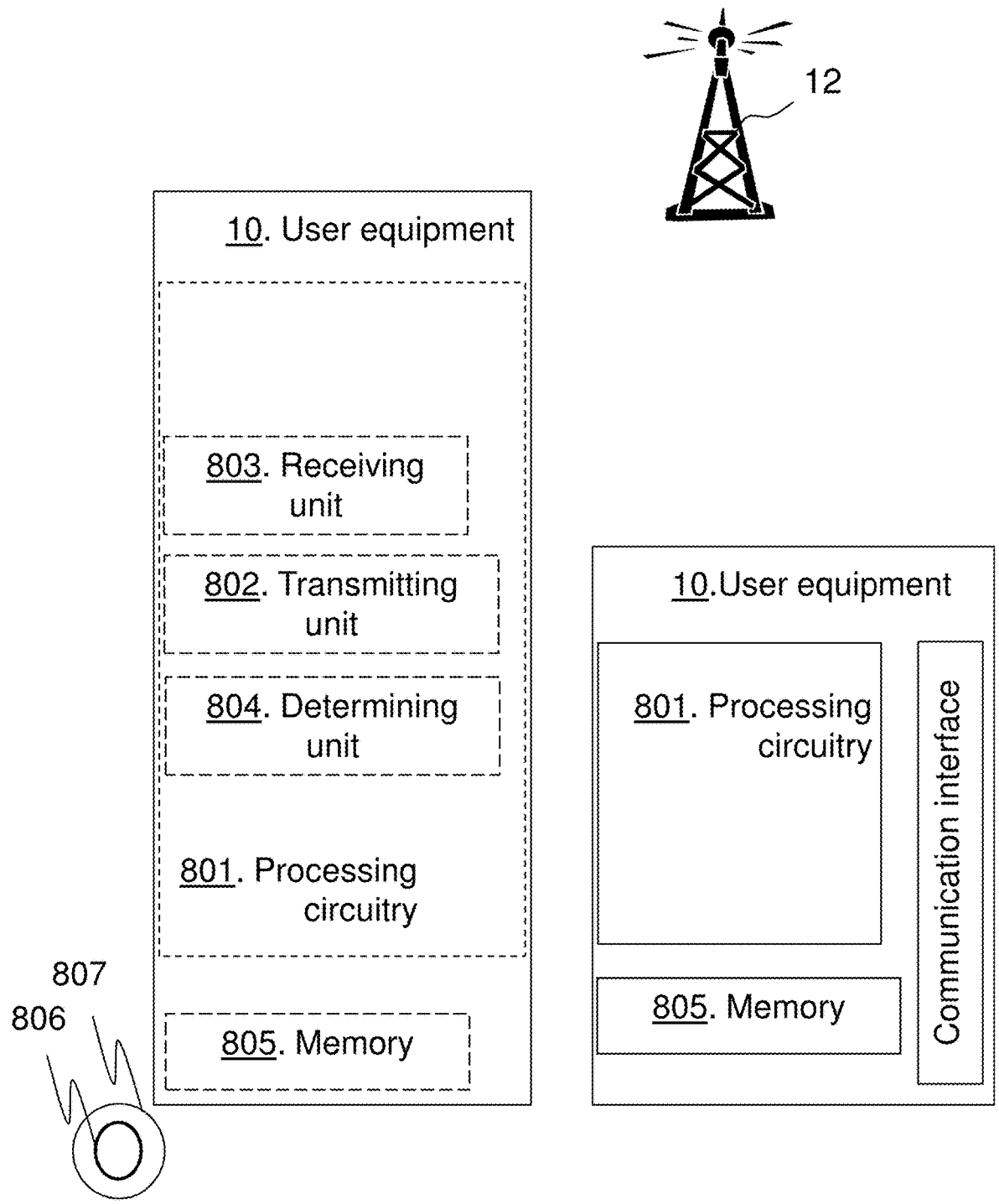
FIG. 8 is a block diagram depicting a UE according to embodiments herein

FIG. 8 is a block diagram depicting the UE 10 for handling communication in the wireless communications network according to embodiments herein.

The UE 10 may comprise a processing circuitry 801, such as one or more processors, configured to perform methods herein.

The UE 10 may comprise a transmitting unit 802, e.g. a transmitter, a transceiver and/or a module. The UE 10, the processing circuitry 801, and/or the transmitting unit 802 is configured to transmit the PHR of the serving cell to the radio network node 12. The PHR of the serving cell comprises the first indication indicating presence of the first type of PH of the first carrier in the PHR of the serving cell. The first type is referring to an uplink RS transmission power. The PHR of the serving cell further comprises the second indication indicating presence of the PH of the second type of the second carrier of the serving cell. The second type is referring to a user data transmission power. Thus, being configured to transmit the indication in the PHR, to the radio network node 12, wherein the indication indicates presence of a type, e.g. type 3, of PH of the carrier in the PHR. The type is referring to the uplink RS, e.g. SRS, transmission power. The PHR may further comprise the second indication indicating presence of the PH of another type of another carrier, wherein the other type is referring to a user data transmission power. The first type may be a type 3 referring to a SRS transmission power and the second type may be a type 1 referring to the user data transmission power. The first carrier may be the new radio uplink carrier and the second carrier may be the SUL carrier, or vice versa. The first indication and the second indication may be in a preconfigured order in the PHR of the serving cell. The first indication and/or the second indication may be comprised in a subheader of medium access control—control element (MAC-CE).

The UE 10 may comprise a receiving unit 803, e.g. a receiver, a transceiver or a module. The UE 10, the processing circuitry 801, and/or the receiving unit 803 may be configured to receive configuration data indicating whether the UE 10 is enabled to report the type of PH or not.

The UE 10 may comprise a determining unit 804. The UE 10, the processing circuitry 801, and/or the determining unit 804 may be configured to determine PH of the carrier by comparing transmission power with a maximum power.

The UE 10 further comprises a memory 805. The memory comprises one or more units to be used to store data on, such as indication, type of PH, configurations, applications to perform the methods disclosed herein when being executed, and similar.

The UE 10 further comprises a communication interface such as a transmitter, receiver, a transceiver and/or one or more antennas.

The methods according to the embodiments described herein for the UE 10 are respectively implemented by means of e.g. a computer program product 806 or a computer program, comprising instructions, i.e., software code portions, which, when executed on at least one processor, cause the at least one processor to carry out the actions described herein, as performed by the UE 10. The computer program product 806 may be stored on a computer-readable storage medium 807, e.g. a disc, a universal serial bus (USB) stick or similar. The computer-readable storage medium 807, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, the UE 10 may comprise the processing circuitry and the memory, said memory comprising instructions executable by said processing circuitry whereby said UE is operative to perform the methods herein.

Figure 9:
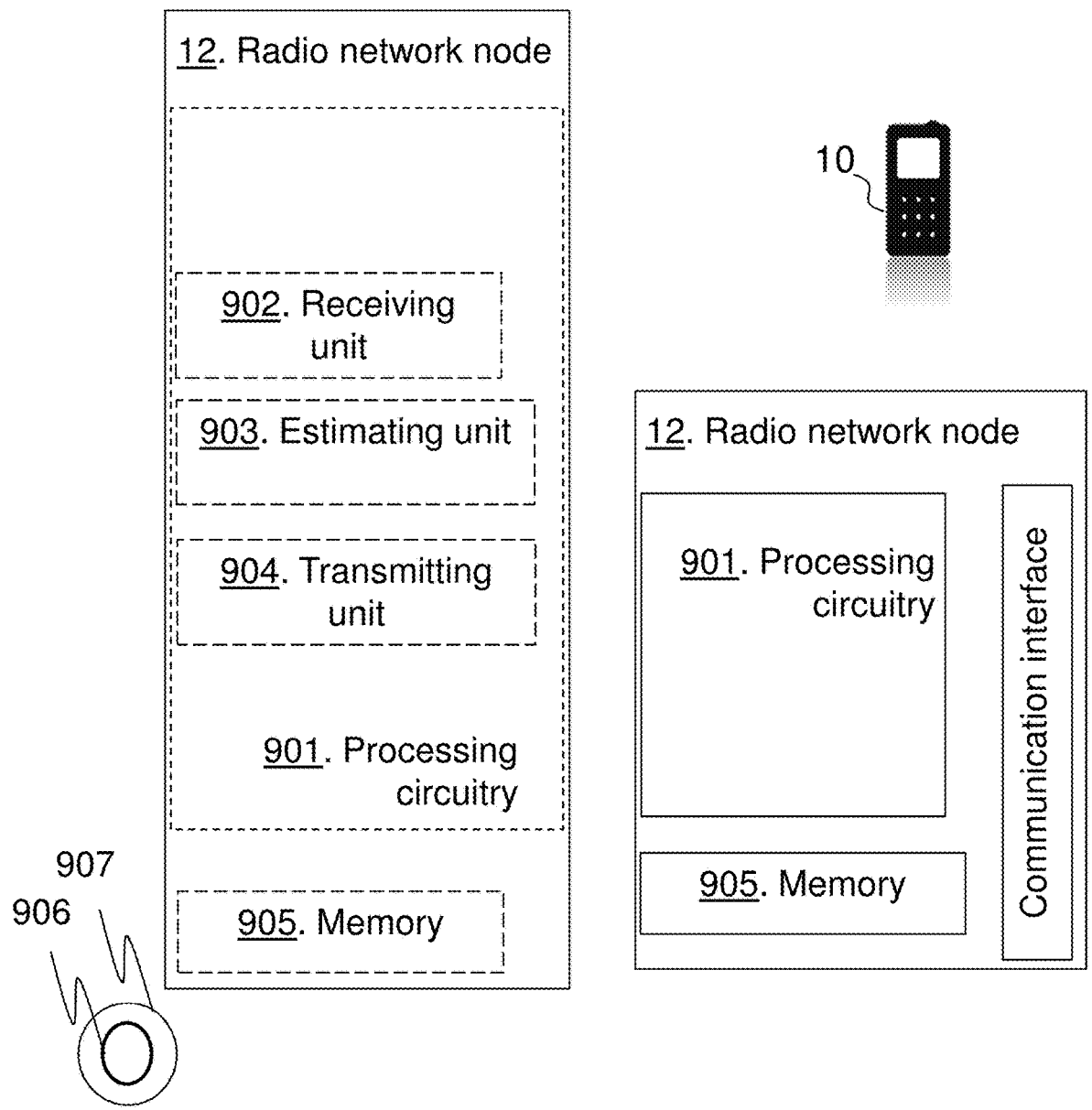
FIG. 9 is a block diagram depicting a radio network node according to embodiments herein.

FIG. 9 is a block diagram depicting the radio network node 12 for handling communication of the UE 10 in the wireless communications network according to embodiments herein.

The radio network node 12 may comprise processing circuitry 901, e.g. one or more processors, configured to perform the methods herein.

The radio network node 12 may comprise a receiving unit 902, a receiver, a transceiver or module. The radio network node 12, the processing circuitry 901, and/or the receiving unit 902 is configured to receive from the UE 10 the first indication in the PHR of the serving cell. The first indication indicates (indirectly or directly) presence of a first type of PH of the first carrier in the PHR of the serving cell and the first type is referring to an uplink RS transmission power. The PHR of the serving cell further comprises the second indication indicating presence of the PH of the second type of the second carrier of the serving cell. The second type is referring to a user data transmission. The first type may be the type 3 referring to the SRS transmission power and the second type may be the type 1 referring to the user data transmission power. The first indication and the second indication may be in a preconfigured order in the PHR of the serving cell. The first carrier may be a new radio uplink carrier and the second carrier may be a SUL carrier or vice versa. The first indication and/or the second indication may be comprised in a subheader of MAC CE.

The radio network node 12 may comprise an estimating unit 903. The radio network node 12, the processing circuitry 901, and/or the estimating unit 903 is configured to estimate the transmission power status of the UE 10 based on the first and/or second type of the PH in the PHR of the serving cell (and may also be based on PH). The radio network node 12, and/or the processing circuitry 901 may be configured to use the estimated transmission power status in MCS selection, rank adaption and/or power control at the radio network node of respective carrier. Thus, handling communication means estimating transmission power status and use in e.g. MCS selection, rank adaption and/or power control.

The radio network node 12 may comprise a transmitting unit 904. The radio network node 12, the processing circuitry 901, and/or the transmitting unit 904 may be configured to transmit the configuration data indicating whether the UE 10 is enabled to report the type of PH or not.

The radio network node 12 further comprises a memory 905. The memory comprises one or more units to be used to store data on, such as indications, transmit power of UEs, PHs, applications to perform the methods disclosed herein when being executed, and similar.

The radio network node 12 further comprises a communication interface such as a transmitter, receiver, a transceiver and/or one or more antennas.

The methods according to the embodiments described herein for the radio network node 12 are respectively implemented by means of e.g. a computer program product 906 or a computer program, comprising instructions, i.e., software code portions, which, when executed on at least one processor, cause the at least one processor to carry out the actions described herein, as performed by the radio network node 12. The computer program product 906 may be stored on a computer-readable storage medium 907, e.g. a disc, a USB stick or similar. The computer-readable storage medium 907, having stored thereon the computer program product, may comprise the instructions which, when executed on at least one processor, cause the at least one processor to carry out the actions described herein, as performed by the radio network node 12. In some embodiments, the computer-readable storage medium may be a transitory or a non-transitory computer-readable storage medium. Thus, the radio network node 12 may comprise the processing circuitry and the memory, said memory comprising instructions executable by said processing circuitry whereby said radio network node is operative to perform the methods herein.

It is thus herein described a method performed by a UE for handling communication in a wireless communications network. The UE transmits in an indication a PHR to a radio network node, wherein the indication indicates (indirectly or directly) presence of a type of PH of a carrier in the PHR and wherein the type is referring to an uplink reference signal (RS) transmission power i.e. type 3.

It is further herein described a method performed by a radio network node for handling communication in a wireless communications network. The radio network node receives, from a UE, an indication in a PHR, which indication indicates (indirectly or directly) presence of a type of PH of a carrier in the PHR and wherein the type is referring to an uplink reference signal (RS) transmission power. The radio network node then estimates a transmission power status of the UE based on the type of the PH in the PHR. Based on the transmission power status of the UE, the radio network node may e.g. perform proper link adaption based on the transmission power status for the UE, including modulation coding scheme MCS selection, rank adaption and power control etc.

It is herein described a UE for handling communication in a wireless communications network. The UE is configured to transmit an indication in a PHR to a radio network node, wherein the indication indicates (indirectly or directly) presence of a type of PH of a carrier in the PHR and wherein the type is referring to an uplink RS transmission power.

It is herein described a radio network node for handling communication in a wireless communications network. The radio network node is configured to receive, from a UE, an indication in a PHR, which indication indicates (indirectly or directly) presence of a type of PH of a carrier in the PHR and wherein the type is referring to an uplink RS transmission power. The radio network node is further configured to estimate a transmission power status of the UE based on the type of the PH in the PHR.

In some embodiments a more general term "radio network node" is used and it can correspond to any type of radio-network node or any network node, which communicates with a wireless device and/or with another network node. Examples of network nodes are gNodeB, NodeB, MeNB, SeNB, a network node belonging to Master cell group (MCG) or Secondary cell group (SCG), base station (BS), multi-standard radio (MSR) radio node such as MSR BS, eNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

The embodiments are described for 5G or NR. However, the embodiments are applicable to any RAT or multi-RAT systems, where the wireless device receives and/or transmit signals (e.g. data) e.g. Wi-Fi, Long Term Evolution (LTE), LTE-Advanced, Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance tradeoffs inherent in these design choices.

Figure 10:
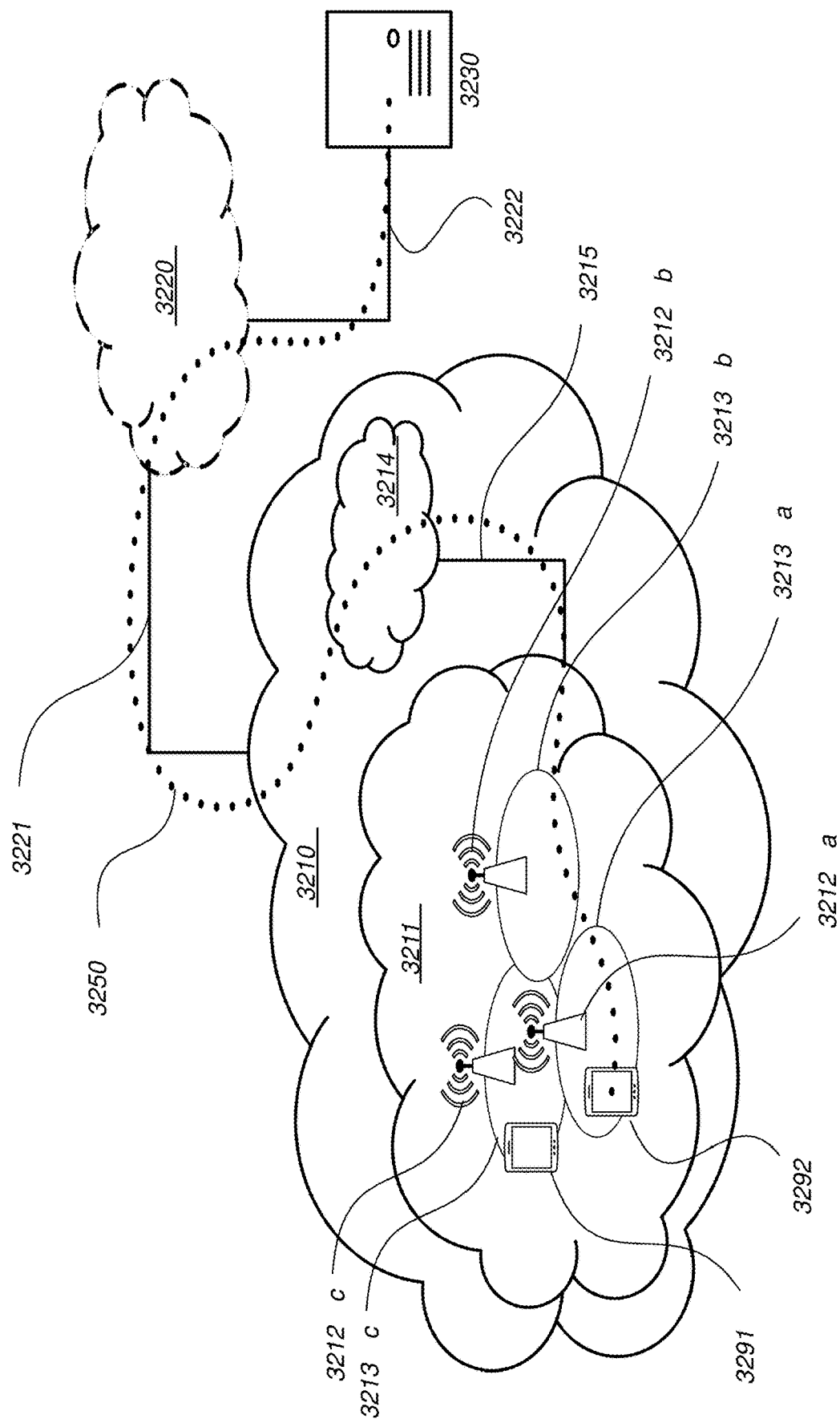
FIG. 10 shows a telecommunication network connected via an intermediate network to a host computer in accordance with some embodiments.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as NBs, eNBs, gNBs or other types of wireless access points being examples of the radio network node 12 herein, each defining a corresponding coverage area 3213a, 3213b, 3213c. Each base station 3212a, 3212b, 3212c is connectable to the core network 3214 over a wired or wireless connection 3215. A first user equipment (UE) 3291, being an example of the UE 10, located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8B) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
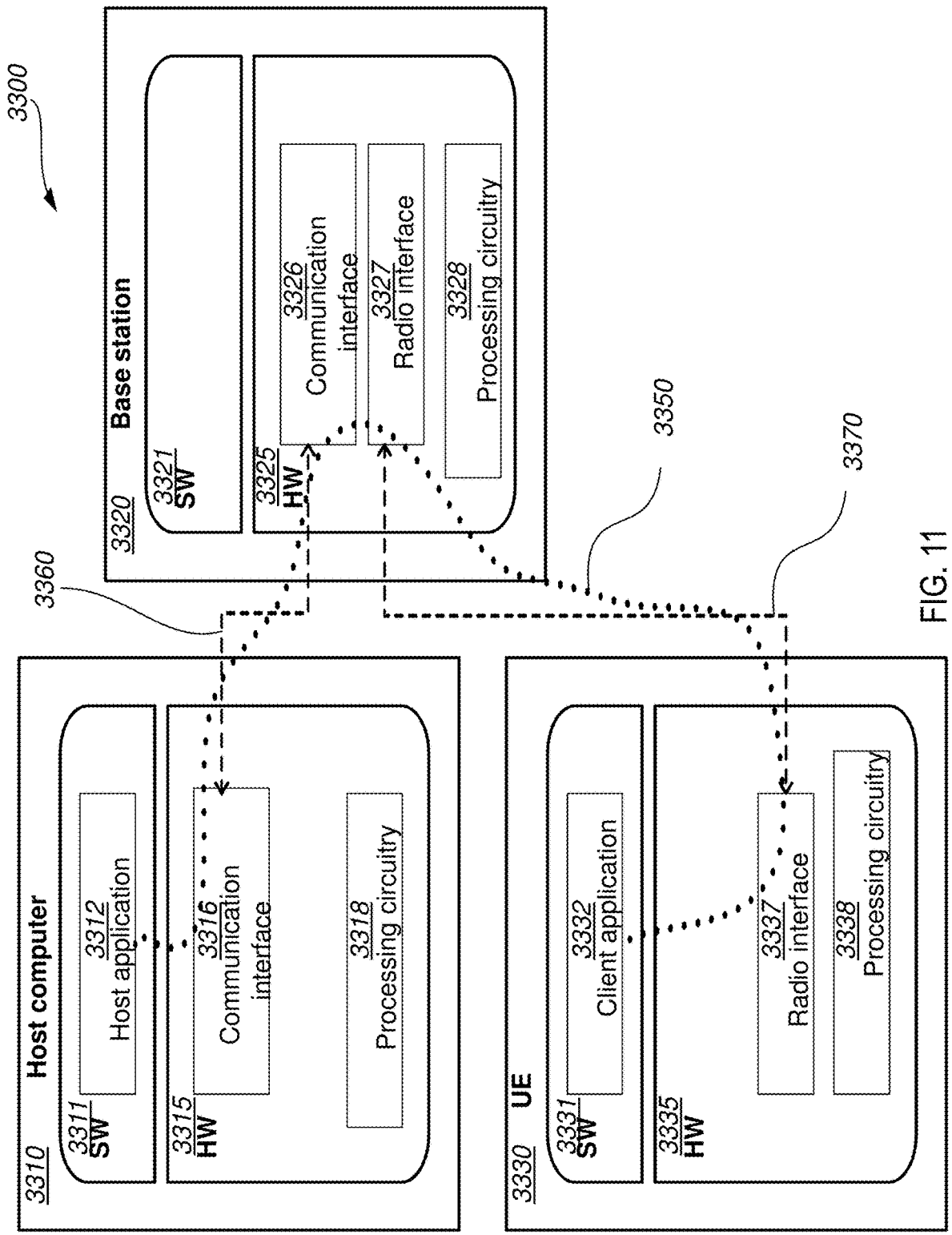
FIG. 11 shows a host computer communicating via a base station with a user equipment over a partially wireless connection in accordance with some embodiments.

It is noted that the host computer 3310, base station 3320 and UE 3330 illustrated in FIG. 11 may be identical to the host computer 3230, one of the base stations 3212a, 3212b, 3212c and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the latency since the UE may use a PHR indicating different types of PHs and thereby provide benefits such as reduced waiting time and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
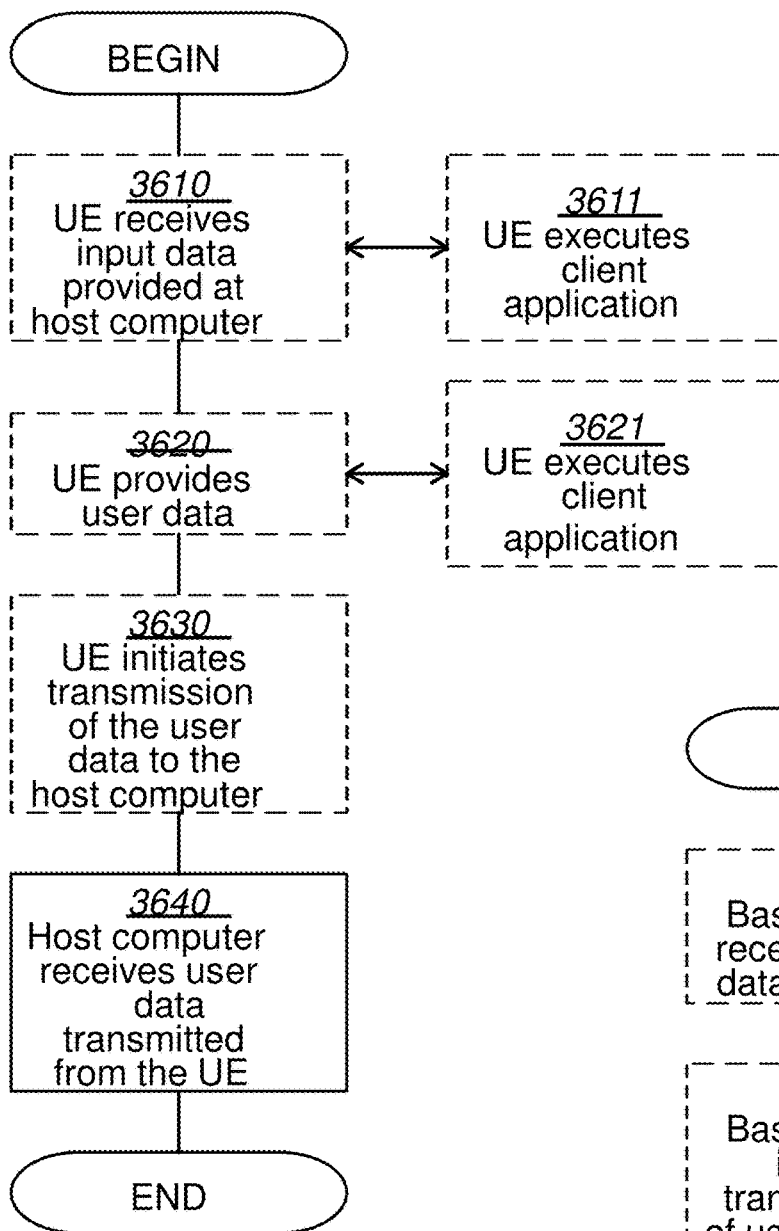
FIG. 14 shows methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:
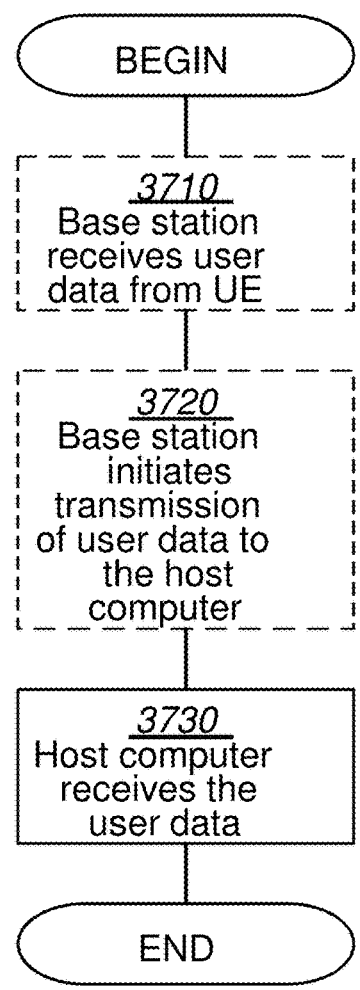
FIG. 15 shows methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station. Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment, UE, for handling communication in a wireless communications network, the method comprising:
  transmitting a first indication in a power headroom report, PHR, of a serving cell to a radio network node, the first indication indicates presence of a first type of power headroom, PH, of a first carrier in the PHR of the serving cell, and the first type refers to an uplink reference signal, RS, transmission power and the PHR of the serving cell further comprises a second indication indicating presence of a PH of a second type of a second carrier of the serving cell, the second type refers to a user data transmission power, the first indication and the second indication are in a preconfigured order in the PHR of the serving cell, the UE is configured by the radio network node that the first carrier is a new radio uplink carrier and the second carrier is a supplementary uplink, SUL, carrier, are placed in a fixed order regardless of physical uplink shared channel, PUSCH, and a placement order of PH is determined based on a type of the carrier in which a PH triggered due to the transmission of the NR carrier is placed first, and a PH triggered due to the transmission on the SUL carried is placed second, and one or both of the first indication and the second indication are comprised in a subheader of a medium access control, MAC, control element, CE, with a reserved bit of the MAC subheader being used to indicate presence of a subsequent type 3 PH.

2. The method according to claim 1, further comprising:
  receiving configuration data indicating whether the UE is enabled to report the type of PH or not.

3. The method according to claim 1, wherein the first type is a type 3 referring to a sounding reference signal, SRS, transmission power and the second type is a type 1 referring to the user data transmission power.

4. A method performed by a radio network node for handling communication in a wireless communications network, the method comprising:
  receiving, from a user equipment, UE, a first indication in a power headroom report, PHR, of a serving cell, the first indication indicates presence of a first type of power headroom, PH, of a first carrier in the PHR of the serving cell and the first type is referring to an uplink reference signal, RS, transmission power, and the PHR of the serving cell further comprises a second indication indicating presence of a PH of a second type of a second carrier of the serving cell, the second type is referring to a user data transmission power; and
  estimating a transmission power status of the UE based on at least one of the first and second type of the PH in the PHR of the serving cell, the first indication and the second indication are in a preconfigured order in the PHR of the serving cell, the UE is configured by the radio network node such that the first carrier is a new radio uplink carrier and the second carrier is a supplementary uplink, SUL, carrier, and are placed in a fixed order regardless of physical uplink shared channel, PUSCH, and a placement order of PH is determined based on a type of the carrier in which a PH triggered due to the transmission of the NR carrier is placed first, and a PH triggered due to the transmission on the SUL carried is placed second, and both of the first indication and the second indication are comprised in a subheader of a medium access control, MAC, control element, CE, with a reserved bit of the MAC subheader being used to indicate presence of a subsequent type 3 PH.

5. The method according to claim 4, further comprising using the estimated transmission power status in modulation coding scheme, MCS, selection, one or both of rank adaption and power control at the radio network node of respective carrier.

6. The method according to claim 4, further comprising transmitting configuration data indicating whether the UE is enabled to report the type of PH or not.

7. The method according to claim 4, wherein the first type is a type 3 referring to a sounding reference signal, SRS, transmission power and the second type is a type 1 referring to the user data transmission power.

8. A user equipment, UE, for handling communication in a wireless communications network, wherein the UE is configured to:
  transmit a power headroom report, PHR, of a serving cell to a radio network node the PHR of the serving cell comprises a first indication indicating presence of a first type of power headroom, PH, of a first carrier in the PHR of the serving cell, and the first type is referring to an uplink reference signal, RS, transmission power and the PHR of the serving cell further comprises a second indication indicating presence of a PH of a second type of a second carrier of the serving cell, the second type is referring to a user data transmission power, the first indication and the second indication are in a preconfigured order in the PHR of the serving cell, the UE is configured by the radio network node such that the first carrier is a new radio uplink carrier and the second carrier is a supplementary uplink, SUL, carrier are placed in a fixed order regardless of physical uplink shared channel, PUSCH, and a placement order of PH is determined based on a type of the carrier in which a PH triggered due to the transmission of the NR carrier is placed first, and a PH triggered due to the transmission on the SUL carried is placed second, and both of the first indication and the second indication are comprised in a subheader of a medium access control, MAC, control element, CE, with a reserved bit of the MAC subheader being used to indicate presence of a subsequent type 3 PH.

9. The UE according to claim 8, wherein the UE is further configured to receive configuration data indicating whether the UE is enabled to report the type of PH or not.

10. The UE according to claim 8, wherein the first type is a type 3 referring to a sounding reference signal, SRS, transmission power and the second type is a type 1 referring to the user data transmission power.

11. A radio network node for handling communication in a wireless communications network, the radio network node is configured to:
  receive from a user equipment, UE, a first indication in a power headroom report, PHR, of a serving cell, the first indication indicates presence of a first type of power headroom, PH, of a first carrier in the PHR of the serving cell and the first type is referring to an uplink reference signal, RS, transmission power, and the PHR of the serving cell further comprises a second indication indicating presence of a PH of a second type of a second carrier of the serving cell, wherein the second type is referring to a user data transmission power; and
  estimate a transmission power status of the UE based on one or both of the first and second type of the PH in the PHR of the serving cell, the first indication and the second indication are in a preconfigured order in the PHR of the serving cell, the UE is configured by the radio network node such that the first carrier is a new radio uplink carrier and the second carrier is a supplementary uplink, SUL, carrier and are placed in a fixed order regardless of physical uplink shared channel, PUSCH, and a placement order of PH is determined based on a type of the carrier, in which a PH triggered due to the transmission of the NR carrier is placed first, and a PH triggered due to the transmission on the SUL carried is placed second, and both of the first indication and the second indication are comprised in a subheader of a medium access control, MAC, control element, CE, with a reserved bit of the MAC subheader being used to indicate presence of a subsequent type 3 PH.

12. The radio network node according to claim 11, wherein the radio network node is configured to use the estimated transmission power status in modulation coding scheme, MCS, selection, one or both of rank adaption and power control at the radio network node of respective carrier.

13. The radio network node according to claim 11, wherein the radio network node is further configured to transmit configuration data indicating whether the UE is enabled to report the type of PH or not.

14. The radio network node according to claim 11, wherein the first type is a type 3 referring to a sounding reference signal, SRS, transmission power and the second type is a type 1 referring to the user data transmission power.

15. A non-transitory computer-readable storage medium, having stored thereon a computer program product comprising instructions which, when executed on at least one processor, cause the at least one processor to carry out a method, the method comprising:
  transmitting a first indication in a power headroom report, PHR, of a serving cell to a radio network node, the first indication indicates presence of a first type of power headroom, PH, of a first carrier in the PHR of the serving cell, and the first type refers to an uplink reference signal, RS, transmission power and the PHR of the serving cell further comprises a second indication indicating presence of a PH of a second type of a second carrier of the serving cell, the second type refers to a user data transmission power, the first indication and the second indication are in a preconfigured order in the PHR of the serving cell, the UE is configured by the radio network node that the first carrier is a new radio uplink carrier and the second carrier is a supplementary uplink, SUL, carrier, are placed in a fixed order regardless of physical uplink shared channel, PUSCH, and a placement order of PH is determined based on a type of the carrier in which a PH triggered due to the transmission of the NR carrier is placed first, and a PH triggered due to the transmission on the SUL carried is placed second, and both of the first indication and the second indication are comprised in a subheader of a medium access control, MAC, control element, CE, with a reserved bit of the MAC subheader being used to indicate presence of a subsequent type 3 PH.

* * * * *